March 28, 1939.   R. W. WEEKS   2,152,576

POWER REGULATING SYSTEM

Filed June 25, 1936   2 Sheets-Sheet 1

Inventor
Robert W. Weeks,

By Ralph B. Stewart
Attorney

Inventor
Robert W. Weeks,
By Ralph B. Stewart
Attorney

Patented Mar. 28, 1939

2,152,576

UNITED STATES PATENT OFFICE 2,152,576

POWER REGULATING SYSTEM

Robert W. Weeks, West Chester, Pa., assignor to Edward M. Weeks, Washington, D. C.

Application June 25, 1936, Serial No. 87,309

9 Claims. (Cl. 290—44)

The present invention relates to power systems and in particular to wind driven power plants for the generation and storage of electric energy.

An object of the invention is to devise apparatus for the automatic control of the electric generator to obtain maximum efficiency from the wind driven turbine.

A further object is to devise control devices for automatically connecting the generator to a storage battery to charge the same when the voltage of the battery drops below a given value and to automatically disconnect the battery from the generator when the voltage of the battery exceeds a given value.

Still another object is to arrange the control apparatus to connect a substitute load across the generator when the battery is disconnected. Also, to provide a signal to indicate when the battery is fully charged and disconnected.

Certain features of my invention are illustrated in the accompanying drawings, in which.

Figure 3:
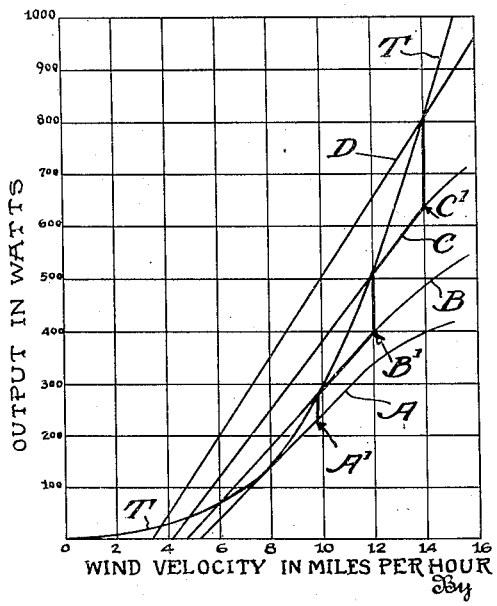
Figure 3 is a series of curves for explaining the operation of my invention.

The power which can be derived from a wind driven turbine or blade does not vary directly with the wind velocity, but it increases faster than the increase in wind velocity. In Figure 3 curve T shows the manner in which the maximum available power output of a wind turbine varies with the wind velocity. In order to have the wind turbine operating at maximum efficiency at all wind velocities, the electric generator driven by the turbine should have a power output characteristic corresponding to curve T in Figure 3, but it is not practical to design an electric generator having a power output curve which varies with the speed of operation in accordance with this curve. In the power systems according to my invention, I prefer to use an ordinary shunt wound generator and to provide apparatus for controlling the field excitation automatically in a manner to increase the output of the generator with increase in speed substantially in accordance with the characteristic curve of the wind turbine shown in curve T of Figure 3.

Curve A in Figure 3 represents the power output curve of an ordinary shunt generator with low field excitation and driven by a wind turbine at different wind velocities. Curves B, C and D represent the generator output over the same range of wind velocity but with increasingly larger field excitation. As will be seen from these curves, the generator does not begin to generate any substantial power until a certain minimum speed is reached depending upon the field circuit condition, then the power output increases with more or less a straight line relation until at certain speeds the curves begin to flatten out. According to my invention, I propose to regulate the output of the generator by operating the generator with low field current in the low range of wind velocities; for example, the power output curve would follow curve A up to the point A', and at this point a relay operates to short-circuit a part of the generator field resistance which will cause the operation to immediately jump to curve B. For further increase in velocity the operation is in accordance with curve B until the point B' is reached at which time a second relay operates and short-circuits another portion of the field resistance to increase the excitation and thereby shift the operation to curve C. Upon further increase in wind velocity, the operation of the system follows curve C until the point C' is reached and then a third relay operates and still further increases the field excitation of the generator to shift the operation to curve D. It will thus be seen that by successively short-circuiting increasing amounts of the field resistance as the wind velocity and the power output increases, it is possible to regulate the generator so that its output increases approximately in accordance with the maximum available power of the wind turbine.

Figure 1:
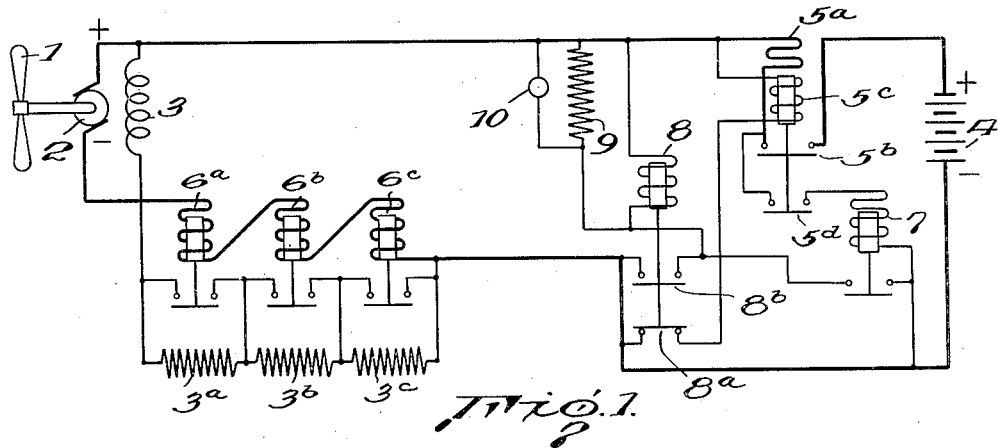
Figure 1 is a circuit diagram showing one arrangement of a wind-driven electric generating system according to my invention.

Referring to Figure 1 the wind turbine is represented at 1 for driving the armature 2 of the generator having a field coil 3. The turbine 1 may be a single-blade type or a multi-blade turbine. Also, it may be of the fixed-blade type, but I prefer to use a turbine provided with an automatic regulating device for changing the angle of the blades to suit the operation to different wind velocities. The generator armature 2 is connected through suitable circuit to storage battery 4 which is kept charged by the generator and which supplies current to a load circuit, not shown. The positive terminal of the generator armature is connected to the positive terminal of the battery through current coil 5a and contacts 5b of a reverse current relay. The negative terminal of armature 2 is connected to the negative terminal of battery 4 through the windings of three current relays 6a, 6b and 6c. A voltage responsive relay 7 is connected across the battery charging line through contact 5d of the reverse current relay, and the contact of relay 7 controls the circuit of relay 8, also connected across the battery charging lines. The potential coil 5c of the reverse current relay is connected across the battery charging lines through the back contact 8a of the relay 8. The contact 8b on relay 8 closes a holding circuit for relay 8 independently of relay 7. A ballast resistance 9 and a signal device 10, such as a lamp or a buzzer, are connected in shunt to the relay 8 and are energized when the circuit of this relay is completed. The contacts on relays 6a, 6b and 6c are arranged to short-circuit field resistances 3a, 3b and 3c respectively when the relays are energized. The field circuit of the generator extends from the positive terminal of the armature 2 through the field coil 3, through resistances 3a, 3b and 3c, through windings of relays 6a, 6b and 6c back to the negative terminal of the armature. If desired, the field circuit may be connected directly to the negative terminal of the armature without passing through the windings of the current relays. Relay 6a is designed to operate in response to a low value of load current while relay 6b requires a higher value of current for its operation, and relay 6c requires a still higher current value for its operation. Relay 7 is set to close at a voltage slightly in excess of the normal voltage of the battery, for example it may be set to close at 7.5 volts for a 6-volt battery.

Operation of the arrangement shown in Figure 1 is as follows: With the generator operating at low speed or in low wind velocities, the circuit connections are as shown in Figure 1 with a maximum resistance included in the field circuit and the generator operating at minimum excitation. As the wind velocity increases and reaches the value at which the generator begins to generate power, as soon as the voltage generated by the generator exceeds the battery voltage, current supplied to the potential winding 5c operates the reverse current relay and connects the generator to the battery through contact 5b. If the wind velocity is below the velocity corresponding to the point A' in Figure 3, nothing further happens, but should the wind velocity reach or exceed this value, the current supplied to the battery increases to a value sufficient to operate the relay 6a and to thereby short-circuit field resistance 3a and increase the excitation of the generator. The operation for wind velocities above this value will now be in accordance with curve B in Figure 3, and in case the wind velocity should reach the point B', the charging current will have increased in value sufficient to operate the relay 6b and to thereby short-circuit field resistance 3b and still further increase the excitation of the generator. The operation for increasing wind velocities will now be in accordance with the curve C, and should the wind velocity increase to the point C', relay 6c will operate and short-circuit field resistance 3c to again increase the generator excitation and, accordingly, increase the output of the generator.

In case the wind velocity decreases beyond any of the points C', B' and A', the corresponding relays 6c, 6b and 6a will drop out and decrease the generator excitation, so as to permit the generator at all times to operate with a load corresponding substantially to the maximum available power output of the wind turbine at any given wind velocity.

If at any time the battery 4 should become fully charged, and the voltage across relay 7 should exceed a given voltage in excess of the normal voltage of the battery, the relay 7 will operate to close the circuit of relay 8, which in turn will open the circuit of the potential coil 5c of the reverse current relay, and the battery circuit will thus be opened at the reverse current relay contact 5b. The circuit of relay 7 will also be opened at contact 5d. When relay 8 operates, it closes a holding circuit for itself through contact 8b, and relay 8, ballast resistance 9 and indicator lamp 10 are thus connected across the generator armature circuit. The ballast resistance 9 serves to provide a small load for the generator during the time when the battery 4 is disconnected. I find that the presence of this resistance has a steadying or stabilizing influence on the regulation of the wind turbine.

From the foregoing, it will be seen that after the battery 4 becomes fully charged and the relay 7 operates, all control devices are disconnected from the battery and no current is taken from the battery for control purposes. The indicator lamp 10 is located in a place convenient to indicate to an attendant of the station that the battery is fully charged and the wind turbine plant may be shut down, as by applying a brake or by turning the blade out of the wind according to known practice. When the generator stops or loses its voltage, the relay 8 returns to its normal position, so that upon again starting up the plant, the reverse current relay will connect the generator to the battery to charge the same as already explained. The arrangement shown in Figure 1 is particularly suited for use in small stations where the wind does not blow continuously but may blow for short periods at a time. Under these circumstances, relay 7 prevents the battery from becoming over-charged, while relay 8 is restored to its normal position each time the wind dies down and re-establishes the circuit of the reverse current relay for connecting the generator to the battery when the wind starts up again.

It will be understood that current coil 5a of the reverse current relay is arranged in the usual manner to oppose the potential coil 5c when current flows from the battery to the generator, so that in case the battery is not fully charged and the generator slows down, current flowing from the battery through the series coil 5a in the opposite direction from the charging direction, will cause the reverse current relay to open and disconnect the battery from the generator.

Figure 1A:
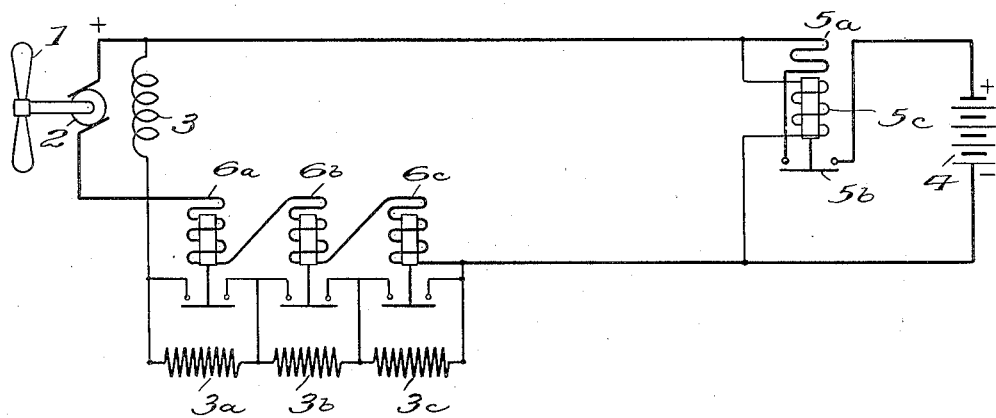
Figures 1a and 1b are circuit diagrams illustrating modifications of the circuit of Figure 1.
Figure 1B:
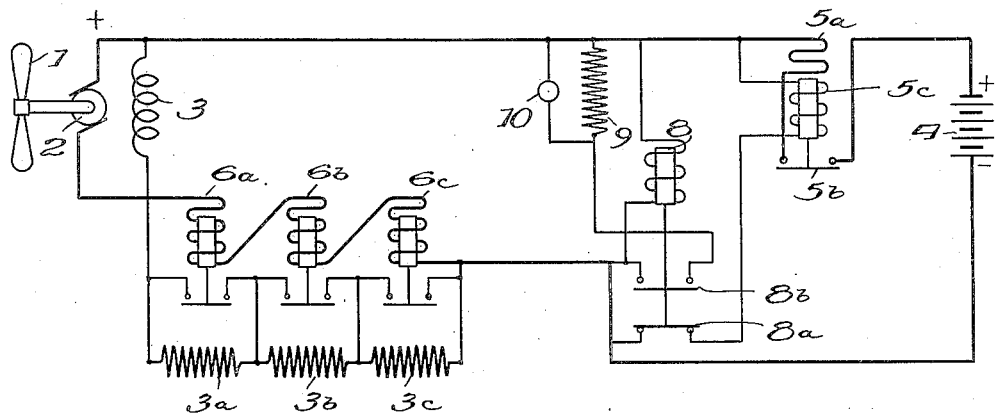

The arrangement which I have devised for regulating the output of the generator by controlling the field excitation is useful independently of other regulating features shown in Figure 1, and, if desired, relays 7 and 8, ballast resistance 9 and lamp 10 may be omitted, but it is desirable to retain the reverse current relay for the purpose of disconnecting the battery from the generator when the wind turbine slows down. In this case the potential coil of the reverse current relay would be connected directly across the charging lines in the usual manner as shown in Figure 1a. Also, the relay 7 may be dispensed with and the circuit normally completed through the contact of this relay may be made a permanent connection. In this case, the relay 8 is connected directly across the charging lines as shown in Figure 1b and should be designed to close at the same voltage at which relay 7 operates. I prefer, however, to use two relays, relay 7 being a small sensitive relay for controlling relay 8 which performs the actual switching operation.

Figure 2:
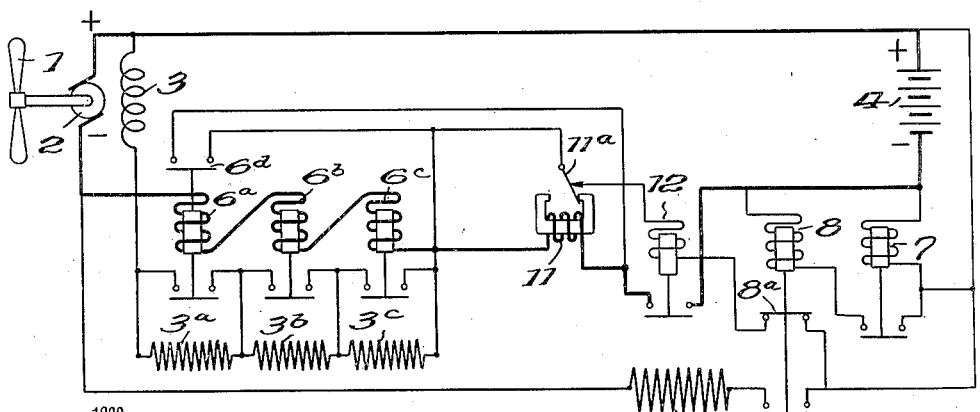
Figure 2 is a circuit diagram showing another arrangement of a wind turbine electric generating system.

In Figure 2 I have shown the circuit diagram of a modified control arrangement which has many features in common with Fig. 1 and corresponding parts are indicated by like reference numerals. The arrangement for regulating the field current of the generator is the same as in Figure 1, but instead of employing the usual reverse current relay for disconnecting the battery from the generator when the generator slows down, I have shown a polarized relay 11 controlling the circuit of a relay 12 whose contact opens and closes the battery charging circuit. It will be understood that a reverse current relay like that of Figure 1 may be substituted for relays 11 and 12 if desired, the current coil of the reverse current relay being connected in the same position as the coil of relay 11 and the potential coil being connected the same as the coil of relay 12.

The armature 11a of polarized relay 11 is normally biased by a weak spring to complete the circuit of the winding of relay 12 which also includes normally closed contact 8a on relay 8. The winding of relay 7 is connected directly across the battery 4, and this relay is adjusted to operate when the battery becomes fully charged and controls the energizing circuit of relay 8 which is also connected across the battery 4. Current relay 6a is provided with a contact 6b arranged to short-circuit the winding of polarized relay 11 when the current relay is energized. Contact 8b on relay 8 is arranged to connect ballast resistance 9a in shunt to the generator armature 2 when relay 8 is energized.

Operation of Figure 2 is as follows: With the generator operating at low speed, the circuit connections are as shown in the drawings. As soon as the speed of the generator increases to a point where the voltage of the generator exceeds the voltage of the battery, relay 12 operates and closes the charging circuit from the generator to the battery. As the charging current supplied to the battery increases to a certain value, relay 6a operates and short-circuits resistance 3a in the field circuit of the generator, and also short-circuits the operating winding of polarized relay 11 so as to remove the resistance of this winding from the charging circuit. Further increases in charging current will cause the operation of relays 6b and 6c to short-circuit additional portions of the field resistance, as described above in connection with Figure 1.

When the battery becomes fully charged, relay 7 operates to complete the circuit of relay 8 which in turn opens the circuit of relay 12, thereby opening the charging circuit of the battery. Relay 8 also connects ballast resistance 9a in shunt to the generator armature and the generator continues to operate, supplying load to the ballast resistance 9a, until the battery voltage drops below that necessary to maintain relay 7 in operated position. As soon as relay 12 opens the charging circuit, current relays 6a, 6b and 6c are de-energized, and the short-circuit around the coil of polarized relay 11 is removed. When the voltage on the battery drops below a certain predetermined point lower than the pick-up voltage, relay 7 drops out and opens the circuit of relay 8 which restores the circuit arrangement to the condition shown in the drawings, and the cycle of operation described above will be repeated.

In the event that the wind dies down while the generator is charging the battery and before the battery becomes fully charged, current relays 6c, 6b and 6a first drop out in order, and when the voltage of the generator decreases below that of the battery, a reverse current will flow through the winding of polarized relay 11 and will operate this relay to open the circuit of relay 12, thereby opening the charging circuit, and this circuit cannot be reclosed until the voltage of the generator exceeds the battery voltage as explained above.

By proper design of the relay 8 shown in Figure 2, this relay may be made to operate at a predetermined voltage and may be connected directly across the battery 4, in which case relay 7 may be dispensed with. I prefer, however, to employ two relays as explained above in connection with Figure 1, relay 7 being a small sensitive relay for controlling the circuit of relay 8 which performs the actual switching operations.

What I claim is:

1. In combination, a fluid turbine, an electric generator driven by said turbine, a field winding connected in shunt to the armature of said generator and having a resistance connected in series therewith, a load circuit for said generator, and means responsive to an increase in current in the load circuit for short-circuiting a portion of said field resistance.

2. In combination, a fluid turbine, an electric generator driven by said turbine, a field winding connected in shunt to the armature of said generator and having a resistance connected in series therewith, a load circuit for said generator, a plurality of relays having energizing windings connected in series with said load circuit, said relays being responsive to increasingly larger values of current flowing in said load circuit for successively short-circuiting increasing amounts of said resistance.

3. In combination, a fluid turbine, an electric generator driven by said turbine, a field winding connected in shunt to the armature of said generator and having a resistance connected in series therewith, a load circuit for said generator, a plurality of relays having energizing windings connected in series with said load circuit, said relays being responsive to increasingly larger values of current flowing in said load circuit for successively short-circuiting increasing amounts of said resistance, a reverse-current relay having a series winding connected in said load circuit, one of said current relays having contacts for short-circuiting the series winding on said reverse current relay in response to a predetermined value of load current.

4. In combination, an electric generator, a storage battery to be charged by said generater, a substitute load for said generator, a relay having normally open contacts for completing a charging circuit from said generator to said battery, a second relay having normally closed contacts for completing the energizing circuit of the first relay and having normally open contacts in a circuit from said generator to said substitute load, a third relay having normally open contacts in the energizing circuit of the second relay and being responsive to an over-voltage condition of said storage battery for energizing the second relay, said first relay having an opposing coil connected in series with the charging circuit, and contacts carried by said first relay and arranged to open the energizing circuit of the third relay when in released position.

5. In combination, a storage battery, a source of current for charging said battery, a relay having a contact for completing a circuit between said source and said battery and having an energizing winding connected across said source in a circuit including normally closed contacts on a second relay, a third relay having a pair of contacts for controlling the circuit of the second relay and being responsive to an over-voltage condition of said battery to energize the second relay and thereby open the energizing circuit of the first relay, and contacts carried by the first relay and arranged to interrupt the energizing circuit of the third relay when the first relay is released.

6. In combination, a storage battery, a source of current for charging said battery, a relay having a contact for completing a circuit between said source and said battery and having an energizing coil connected across said circuit, a polarized relay connected in series with said circuit and having a normally closed contact included in the coil circuit of the first relay, said polarized relay being operable upon flow of reverse current in said circuit to de-energize said first relay.

7. In combination, a storage battery, a source of current for charging said battery, a relay having a contact for completing a circuit between said source and said battery, and having an energizing coil connected across said circuit, a polarized relay connected in series with said circuit and having a normally closed contact included in the coil circuit of the first relay, said polarized relay being operable upon flow of reverse current in said circuit to de-energize said first relay, and means responsive to an over-voltage condition of said battery for interrupting the energizing circuit of said first relay.

8. In combination, a storage battery, a source of current of variable voltage for charging said battery, a reverse current relay having a series coil included in the charging circuit, and a second relay responsive to the flow of a predetermined charging current for short-circuiting the series winding on said reverse current relay.

9. In combination, a storage battery, a variable speed generator for charging said battery, said generator having a field coil connected in shunt with its armature and having a resistance connected in series therewith, a reverse current relay having a series coil included in the charging circuit, and a second relay having an energizing winding included in said charging circuit and being responsive to the flow of a predetermined value of charging current for short-circuiting a portion of said field resistance and for short-circuiting the series winding on said reverse current relay.

ROBERT W. WEEKS.